United States Patent
Pandey et al.

(10) Patent No.: US 11,019,043 B2
(45) Date of Patent: May 25, 2021

(54) METHOD AND APPARATUS FOR UPDATING AN ENCRYPTION KEY

(71) Applicant: NXP B.V., Eindhoven (NL)

(72) Inventors: Sujan Pandey, Waalre (NL); Piotr Polak, Eindhoven (NL)

(73) Assignee: NXP B.V., Eindhoven (NL)

( * ) Notice: Subject to any disclaimer, the term of this patent is extended or adjusted under 35 U.S.C. 154(b) by 106 days.

(21) Appl. No.: 15/476,122

(22) Filed: Mar. 31, 2017

(65) Prior Publication Data

US 2018/0034794 A1   Feb. 1, 2018

(30) Foreign Application Priority Data

Jul. 29, 2016  (EP) ..................................... 16181906

(51) Int. Cl.

| H04L 29/06 | (2006.01) |
| H04L 9/08 | (2006.01) |
| H04L 9/32 | (2006.01) |
| H04L 9/12 | (2006.01) |

(52) U.S. Cl.
CPC .......... H04L 63/061 (2013.01); H04L 9/0872 (2013.01); H04L 9/0891 (2013.01); H04L 9/3297 (2013.01); H04L 63/123 (2013.01); H04L 9/12 (2013.01)

(58) Field of Classification Search
CPC ... H04L 63/061; H04L 63/123; H04L 9/0872; H04L 9/0891; H04L 9/12; H04L 9/3297
See application file for complete search history.

(56) References Cited

U.S. PATENT DOCUMENTS

| 7,808,266 B2 | 10/2010 | Marsall et al. |
| 2004/0228360 A1* | 11/2004 | Bae ...................... H04L 9/0869 370/432 |
| 2006/0255872 A1 | 11/2006 | Hino |
| 2011/0148536 A1 | 6/2011 | Italia et al. |

(Continued)

FOREIGN PATENT DOCUMENTS

| EP | 2555449 A1 | 6/2013 |
| WO | 0113569 A1 | 2/2001 |

OTHER PUBLICATIONS

Au et al., "Zyfer's StealthKey Management for frequent rekeying", Internet Engineering Task Force—Internet draft, Category: Informational, Jun. 2002, 20 pages.

(Continued)

*Primary Examiner* — Joseph P Hirl
*Assistant Examiner* — Ka Shan Choy

(57) ABSTRACT

A method and apparatus for updating an encryption key for performing encrypted communication over a communications network. The method comprises, within a timestamp distribution node, transmitting a message to at least one timestamp reception node of the communications network containing a timestamp value. The method further comprises, within the at least one timestamp reception node, receiving the message from the timestamp distribution node and extracting the timestamp value. Wherein, within each of the timestamp distribution node and the at least one timestamp reception node, the method comprises generating at least one updated encryption key for performing encrypted communication based at least partly on the extracted timestamp value.

15 Claims, 3 Drawing Sheets

(56) References Cited

U.S. PATENT DOCUMENTS

| | | | |
|---|---|---|---|
| 2012/0140923 A1* | 6/2012 | Lee | H04L 9/088 |
| | | | 380/45 |
| 2012/0246471 A1* | 9/2012 | Ozaki | G06F 21/10 |
| | | | 713/165 |
| 2012/0286889 A1 | 11/2012 | Park et al. | |
| 2016/0119302 A1* | 4/2016 | Yi | H04N 21/436 |
| 2016/0142205 A1 | 5/2016 | Mohan et al. | |
| 2017/0134382 A1* | 5/2017 | Darnell | H04L 63/10 |
| 2017/0288976 A1* | 10/2017 | Wang | A63H 33/062 |
| 2018/0144341 A1* | 5/2018 | Karkkainen | G06Q 20/02 |

OTHER PUBLICATIONS

Menezes et al., 'Handbook of Applied Cryptography', CRC Press, 1996. (C)1997 by CRC Press, Inc. 54 pages.

* cited by examiner

METHOD AND APPARATUS FOR UPDATING AN ENCRYPTION KEY

FIELD OF THE INVENTION

This invention relates to a method and apparatus for updating an encryption key, and in particular to a method and apparatus for updating an encryption key for performing encrypted communication over a communications network.

BACKGROUND OF THE INVENTION

Encryption keys are often used within communication networks to enable secured communication between network nodes. For example, the IEEE (Institute of Electrical and Electronics Engineers) MAC (Media Access Control) security standard 802.1AE defines a secure communication protocol that employs a Galois/Counter Mode of Advanced Encryption Standard cipher using either a 128-bit or 256-bit encryption key.

In order to improve security, IEEE 802.1AE provides the possibility for different encryption keys to be used for different secure channels. In this manner, if one encryption key becomes compromised, only the channel for which the compromised encryption key is used will become compromised, whilst the remaining channels remain secure. However, in applications that comprise a large number of nodes and secure channels, such as automotive applications, it is not practical to implement unique encryption keys across all secure channels.

The number of encryption keys used across such a large network may be reduced be re-using encryption keys for multiple secure channels. However, in such a scenario the number of channels that would become compromised if an encryption key was compromised would increase significantly, and as such the security of the network is significantly reduced.

SUMMARY OF THE INVENTION

The present invention provides a network node and a method of updating an encryption key for performing encrypted communication over a communications network as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
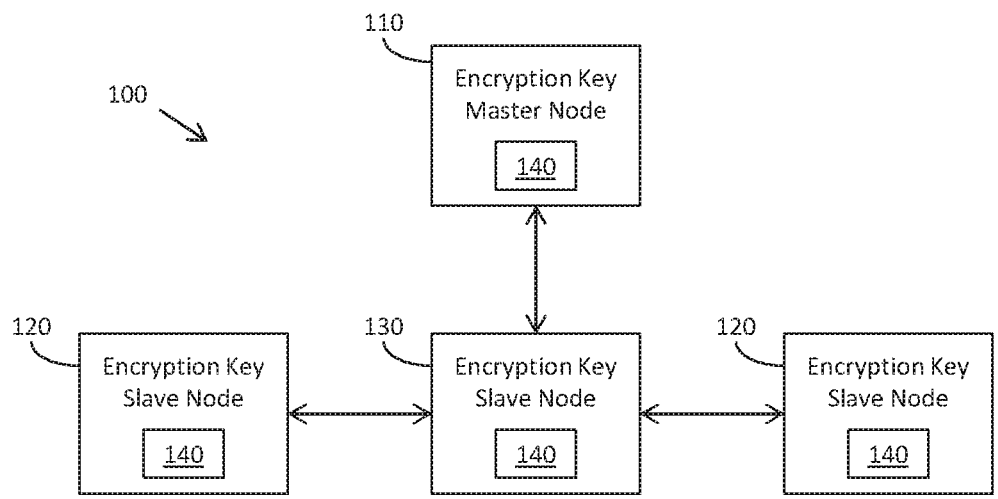
FIG. 1 illustrates a simplified block diagram of an example of a part of a communications network.

FIG. 1 illustrates a simplified block diagram of an example of a part of a communications network 100, for example an automotive Ethernet communications network or the like, over which network nodes are able to communicate. In the illustrated example, the communications network 100 comprises a timestamp distribution node 110 and a number of timestamp reception nodes 120, 130. As described in greater detail below, the network nodes 110, 120, 130 are arranged to use changing encryption keys to enable secured communication there between. Advantageously, by using changing encryption keys for secured communication in this manner, the potential for encryption keys in use becoming compromised is significantly reduced. Furthermore, if an encryption key becomes compromised the security of the communications can be recovered upon the encryption key subsequently being changed.

In particular, it is proposed to use a timestamp value for a message sent from, in the example illustrated in FIG. 1, the timestamp distribution node 110 to the timestamp reception nodes 120, 130 as a seed from which a new encryption key may be generated. Timestamp values are sampled values of a continuously incrementing counter. The precise sampling moment of such a timestamp counter is non-deterministic due to the non-deterministic timing between a decision to transmit a message and the subsequent generation and transmission of the message.

Figure 2:
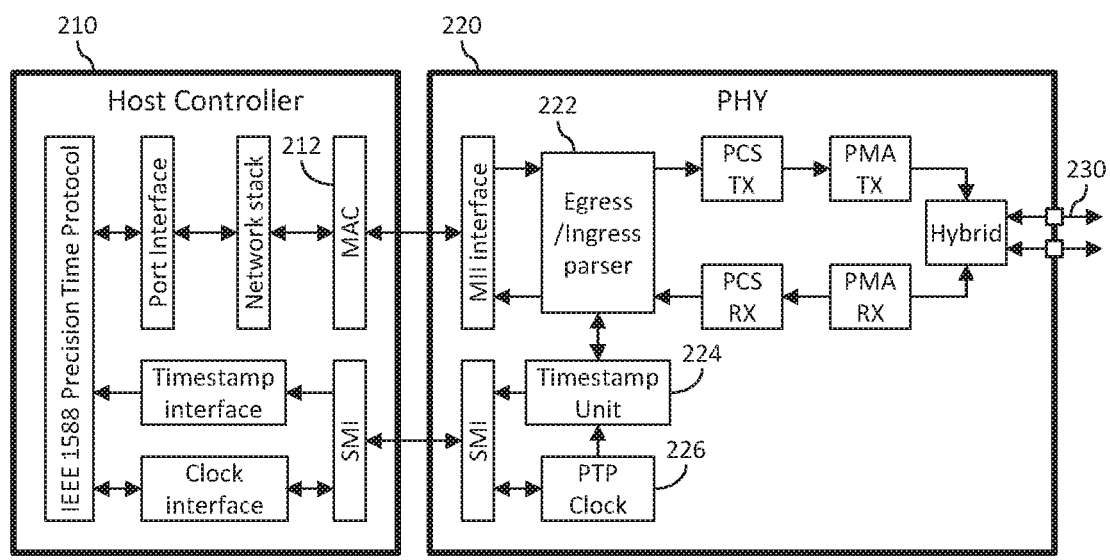
FIG. 2 illustrates a simplified block diagram of an example of a network node.

FIG. 2 illustrates a simplified block diagram of an example of a network node, such as the timestamp distribution node 110 or one of the timestamp reception nodes 120, 130 illustrated in FIG. 1, arranged to implement the IEEE 1588 Precision Time Protocol (PTP) used to synchronize clocks throughout a computer network. Messages to be transmitted are assembled within the MAC (Media Access Controller) layer 212 of the host controller 210, for example in response to a command received from an application layer (not shown), and then sent to the physical (PHY) layer 220, for example over a media independent interface (MII) bus, where the message is coded for transmission over the transmission channel 230. Conversely, messages received over the transmission channel 230 are decoded by the PHY layer and passed on up to the MAC layer 212 over the MII bus.

In the example illustrated in FIG. 2, timestamping of transmitted and received messages is performed within the PHY layer 220 by a parser 222. When, for example, a Start of Frame (SoF) symbol is detected within the message being transmitted or received, the parser 222 notifies a timestamp unit 224 which captures the PTP clock value 226 at that moment. The captured PTP clock value 226 is then passed up to the host controller 210, for example via a serial management interface (SMI), where it is used as a timestamp for the transmitted/received message.

Notably, the time taken from the host controller 210 initiating the generation of a message to the moment when the timestamp unit 224 captures the PTP clock value 226 is non-deterministic. Accordingly, such a timestamp value provides a substantially random seed value that may be used to generate a new encryption key, as described in greater detail below.

Figure 3:
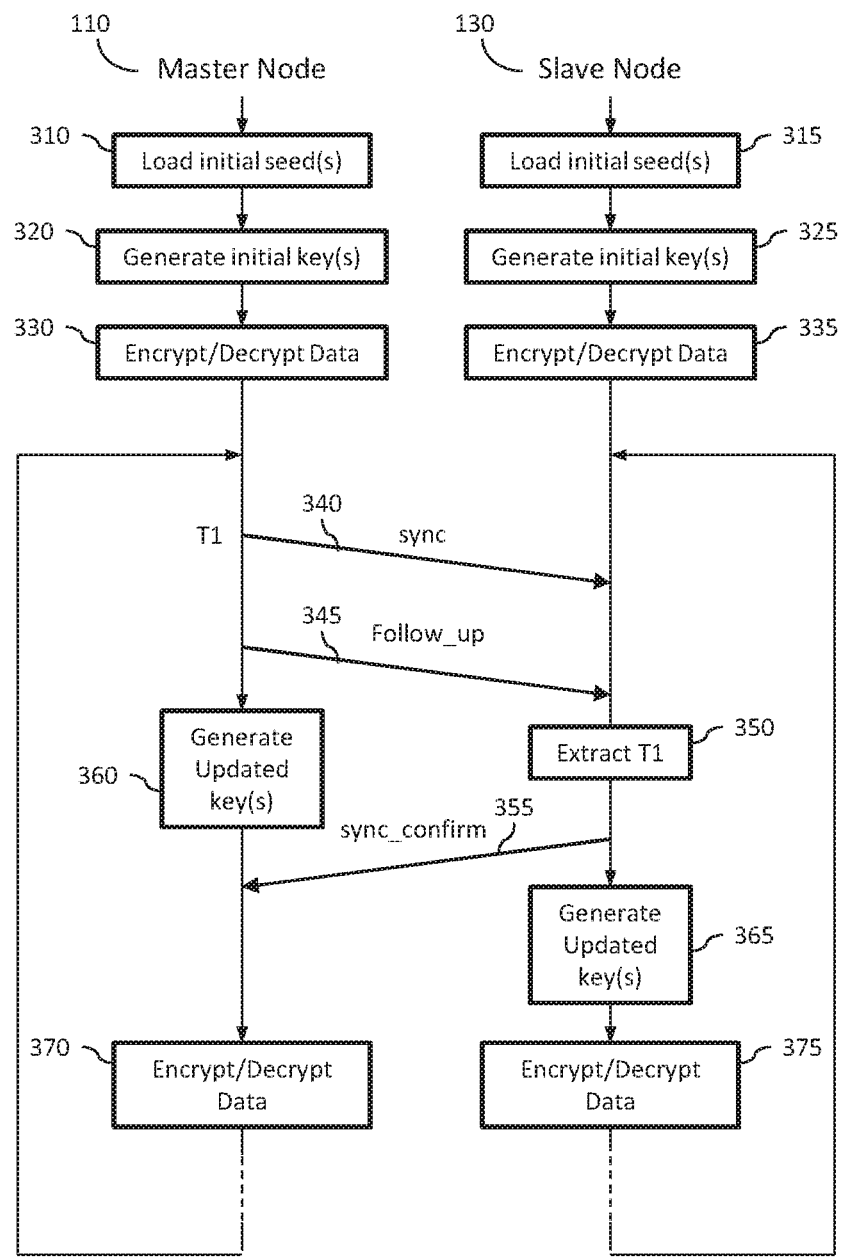
FIG. 3 illustrates a simplified flowchart of an example of a method of updating an encryption key.

For example, in many communication systems, such as communication systems conforming to the IEEE 802.1AE standard, it is known for network nodes to be synchronised through the use of timestamped synchronisation messages transmitted by a master node, whereby timestamps are exchanged between network nodes and used to synchronise the internal clocks of the timestamp reception nodes to the internal clock of the master node. FIG. 3 illustrates a simplified flowchart 300 of an example of a method of updating an encryption key utilising a 'two-step' synchronisation process for exchanging a timestamp value between a master node, for example the timestamp distribution node 110 of FIG. 1, and a slave node, such as the timestamp reception node 130 of FIG. 1.

The method starts at 310 and 315 whereby, in the illustrated example, each node 110, 130 is arranged to load one or more initial (default) seed value(s) from which one or more initial (default) encryption key(s) is/are generated at 320, 325. The initial seed(s) is/are pre-configured and may be stored within, for example, read-only one-time programmable memory of the network nodes 110, 130 to enable the initial encryption key(s) commonly known by all of the network nodes 110, 130 within the network to be generated. The initial encryption key(s) generated at 320, 325 may then be used by the network nodes to encrypt/decrypt data transmitted over the communications network 100 (FIG. 1), as illustrated generally at 330, 335. In some alternative embodiments, pre-configured initial encryption key(s) may be stored within memory and loaded and used directly (without the need for them to be generated).

The timestamp distribution node 110 subsequently initiates a synchronisation process to synchronise the internal clock of the timestamp reception node 130 to the internal clock of the timestamp distribution node 110. In the example illustrated in FIG. 3, a two-step synchronisation process is performed whereby the timestamp distribution node 110 initially broadcasts a synchronisation message 340 to the timestamp reception node 130. As previously described with reference to FIG. 2, a timestamp value T1 for the synchronisation message 340 is captured upon transmission, and in the example illustrated in FIG. 2 passed up to the host controller 210 of the timestamp distribution node 110. The timestamp distribution node 110 is then arranged to transmit a follow up message 345 to the timestamp reception node 130 containing the timestamp value T1 for the synchronisation message 340. The timestamp reception node 130 may then extract the timestamp value T1 from the follow up message 345. In this manner, the timestamp value T1 for the synchronisation message 340 is made available to the timestamp distribution node 110 and the timestamp reception node 130. In the illustrated example, the timestamp reception node 130 are arranged to transmit synchronisation confirmation messages 355 back to the timestamp distribution node 110 as part of the two-step synchronisation process.

Within each of the timestamp distribution node 110 and timestamp reception node 130, one or more updated encryption key(s) may then generated based on the timestamp value T1, as illustrated at 360 and 365 in FIG. 3. For example, each of the network nodes 110, 130 may comprise an encryption key generation component 140 (FIG. 1) arranged to receive the timestamp value T1 and generate the updated encryption key(s) for performing encrypted communication based on the timestamp value T1.

Figure 4:
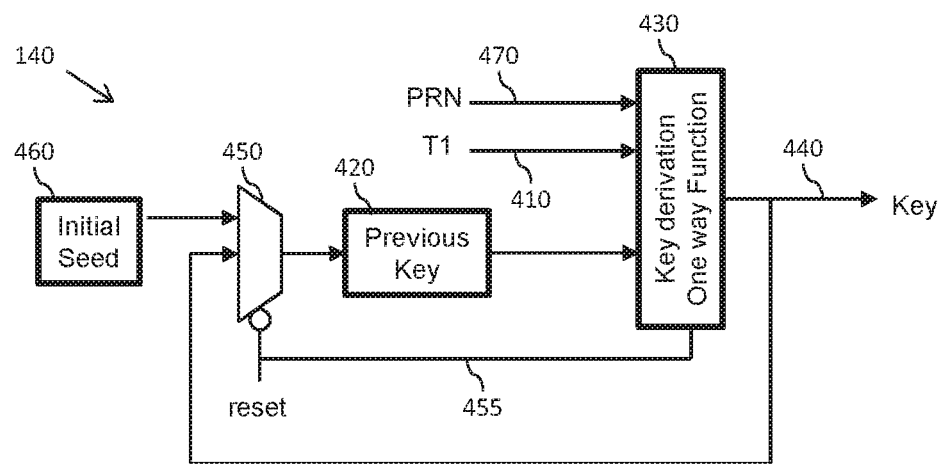
FIG. 4 illustrates a simplified block diagram of an example of an encryption key generation component.

FIG. 4 illustrates a simplified block diagram of an example of such an encryption key generation component 140. In the example illustrated in FIG. 4, the encryption key generation component 140 is arranged to apply the timestamp value T1, indicated at 410, and a seed value 420, which in the illustrated example comprises a previously generated encryption key value held within a register, to a key generation function 430. The key generation function 430 is arranged to generate an (updated) encryption key 440 based on the extracted timestamp value and the previous encryption key 420.

In the example illustrated in FIG. 4, the updated encryption key generated by the key generation function 430 is fed back to a first input of a multiplexer component 450. A pre-configured seed value 460 is provided to a second input of the multiplexer component 450. A reset signal 455 is received at a control input of the multiplexer component 450 such that, upon the reset signal 455 being asserted, the pre-configured seed value 460 is output by the multiplexer component 450 and stored within the register as the seed value 420 applied to the key generation function 430. In this manner, upon a reset condition (when the reset signal 455 is asserted), the encryption key generation component 140 is arranged to generate an updated encryption key value 440 based on the pre-configured seed value 460. Upon such a reset condition, no timestamp value T1 410 from a timestamp distribution node will be available. Accordingly, in the illustrated example, the reset signal 455 is also provided to the key generation function 430 to cause the key generation function to generate an initial encryption key value 440 based on the pre-configured seed value 460 but not on a timestamp value T1 410.

Conversely, when the reset signal 455 is de-asserted, previously generated encryption key value 440 is output by the multiplexer component 450 and stored within the register as the seed value 420 applied to the key generation function 430. In this manner, the encryption key generation component is arranged to generated an updated encryption key value based on the timestamp value T1 410 received from a timestamp distribution node 110 (FIG. 1) and the previously generated encryption key value 420.

In some alternative embodiments, the timestamp distribution node 110 may further be arranged to transmit a random noise value along with the timestamp value T1, and the timestamp reception node 130 may be arranged to extract the random noise value along with the timestamp value T1, and to generate the updated encryption key value(s) further based on the random noise value. For example, the encryption key generation component 140 illustrated in FIG. 4 is further arranged to apply such an extracted random noise value 470 to the key generation function 430, and the key generation function 430 is arranged to generate an (updated) encryption key 440 further based on the random noise value 470.

The encryption generation function 430 may be arranged to generate the (updated) encryption key using any suitable encryption cipher, such as a 128-bit AES-GCM (Advanced Encryption Standard-Galois/Counter Mode) cipher.

The encryption key generation component 140 may be implemented in any suitable manner within the respective network node 110, 130. For example, it is contemplated that the encryption key generation component 140 may be implemented as a part of the host controller 210 (FIG. 2) of the respective network node 110, 130. Alternatively, the encryption key generation component 140 may be implemented as a standalone component or in some embodiments as part of the physical layer 220 of the respective network node 110, 130.

Referring back to FIG. 3, in the illustrated example the timestamp distribution node 110 is illustrated as generating the updated encryption key(s) prior to receiving the synchronisation confirmation message 355 from the timestamp reception node 130, and the timestamp reception node 130 is illustrated as generating the updated encryption key(s) after transmitting the synchronisation confirmation message 355. However, it will be appreciated that the timestamp distribution node 110 could equally be arranged to generate the updated encryption key(s) after receiving the synchronisation confirmation message 355 and/or the timestamp reception node 130 could equally be arranged to generate the updated encryption key(s) prior to transmitting the synchronisation confirmation message 155.

Having generated the updated encryption key(s), the network nodes 110, 130 are then arranged to use the updated encryption key(s) to encrypt/decrypt data transmitted over the communications network 100 (FIG. 1), as illustrated generally at 370, 375. As illustrated in FIG. 3, the steps 340 to 375 of updating the encryption key(s) may be repeated periodically (or sporadically). In this manner, the encryption key(s) are continuously changing, thereby improving the security of communications between the network nodes 110, 130.

In the example illustrated in FIG. 1, the timestamp reception node 130 comprises a switch node located between the timestamp distribution node 110 and the two further timestamp reception nodes 120. In some example embodiments, it is contemplated that the timestamp reception node 130 may be further arranged to forward the timestamp value T1 (and if appropriate the random noise value) received from the timestamp distribution node 110 to each 'downstream' timestamp reception node 120 connected thereto. Similarly, the further timestamp reception nodes 120 may forward the timestamp value T1 (and if appropriate the random noise value) to any downstream timestamp reception nodes (not shown) connected thereto. In this manner, the timestamp value T1 (and if appropriate the random noise value) may be cascaded through the communications network 100, enabling each node 110, 120, 130 within the communications network to independently generate an updated encryption key based on the timestamp value T1 (and if appropriate the random noise value) cascaded throughout the communications network. Notably, cascading the timestamp value T1 (and if appropriate the random noise value) through the communications network 100 in this way ensures that even if the timestamp value T1 is lost or not forwarded to some of the nodes, the encryption keys for a downstream port-to-port connection will stay in-sync.

In some example embodiments, the network nodes 110, 120, 130 may be arranged to maintain the immediately previous encryption key in case of packet losses or any undesired situation where a packet encoded with the previous encryption key is received. If a received packet cannot be decrypted with either the current (updated) encryption key or the immediately previous encryption key, it may assumed that the received message is from an illegitimate source.

In FIG. 3, a method of updating an encryption key utilising a 'two-step' synchronisation process for exchanging a timestamp value between a timestamp distribution node 110 and a timestamp reception node 120, 130 has been illustrated and herein described. However, it is contemplated that the timestamp value may be distributed by the timestamp distribution node to the timestamp reception nodes 120, 130 using an alternative mechanism, such as a 'one-step' synchronisation process or via a dedicated timestamp distribution broadcast message.

Furthermore, in the example illustrated in FIG. 1, a network master node distributes the timestamp value, as part of the two-step synchronisation process. However, it is contemplated that in some alternative embodiments the timestamp distribution node may comprise a network slave node, and is not limited to being implemented within a network master node.

In some embodiments, it is contemplated that the invention may be implemented at least in part in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network module arranged to perform encrypted communication over a communications network; the network module being arranged to:
   generate an initial encryption key that is commonly known to a plurality of nodes in the communications network by supplying a pre-configured seed value to an encryption key generator in each of the plurality of nodes to generate the initial encryption key;
   receive a message from a timestamp distribution node of the communications network containing a timestamp value, and
   extract the timestamp value from the received message;
   perform a synchronization process with the timestamp distribution node and the network module using the timestamp;
   wherein the encryption key generator at the network module is arranged to receive the extracted timestamp value and generate at least one updated encryption key for performing encrypted communication based at least partly on the extracted timestamp value and either the initial encryption key or a seed value derived from the initial encryption key.

2. The network module of claim 1, wherein the encryption key generator is arranged to apply the extracted timestamp value and either the initial encryption key or the seed value derived from the initial encryption key to a key generation function to generate the at least one updated encryption key.

3. The network module of claim 2, wherein the seed value comprises a previously generated updated encryption key.

4. The network module of claim 1, wherein the network module is further arranged to extract a random noise value from the received message, and the encryption key generator is further arranged to generate the at least one updated encryption key based at least partly on the extracted random noise value.

5. The network module of claim 1, wherein the network module is arranged to receive the message containing the timestamp value from the timestamp distribution node as a part of a synchronisation process.

6. The network module of claim 5, wherein the received message containing the timestamp value comprises:
   a follow up message of a two-step synchronisation process.

7. The network module of claim 1, wherein the network module is arranged to perform encrypted communication over an automotive communications network.

8. A network module arranged to perform encrypted communication over a communications network;
   the network module being arranged to generate an initial encryption key that is commonly known to a plurality of nodes in the communications network by supplying a pre-configured seed value to an encryption key generator in each of the plurality of nodes to generate the initial encryption key and to receive a message containing a timestamp value;
   perform a synchronization process with the timestamp distribution node and the network module using the timestamp;
   wherein the encryption key generator at the network module is arranged to receive the timestamp value contained within the received message and generate at least one updated encryption key for performing encrypted communication based at least partly on the extracted timestamp value and either the initial encryption key or a seed value derived from the initial encryption key.

9. The network module of claim 8, wherein the encryption key generator is arranged to apply the extracted timestamp value and either the initial encryption key or the seed value derived from the initial encryption key to a key generation function to generate the at least one updated encryption key.

10. The network module of claim 9, wherein the at least one seed value comprises a previously generated updated encryption key.

11. The network module of claim 8, wherein the network module is further arranged to receive a random noise value within the received message, and the encryption key generator is further arranged to generate the at least one updated encryption key based at least partly on the random noise value.

12. The network module of claim 8, wherein the network module is arranged to receive the message containing the timestamp value as a part of a synchronisation process.

13. The network module of claim 12, wherein the received message containing the timestamp value comprises:
    a follow up message of a two-step synchronisation process.

14. The network module of claim 8, wherein the network module is arranged to perform encrypted communication over an automotive communications network.

15. A method of updating an encryption key for performing encrypted communication over a communications network; the method comprising:
    within a timestamp distribution node, transmitting a message to at least one timestamp reception node of the communications network containing a timestamp value;
    within the at least one timestamp reception node, generating an initial encryption key that is commonly known to a plurality of nodes in the communications network by supplying a pre-configured seed value to an encryption key generator to generate the initial encryption key in each of the plurality of nodes and receiving the message from the timestamp distribution node and extracting the timestamp value;
    perform a synchronization process with the timestamp distribution node and the network module using the timestamp; and
    within each of the timestamp distribution node and the at least one timestamp reception node, generating at least one updated encryption key for performing encrypted communication based at least partly on the extracted timestamp value and either the initial encryption key or a seed value derived from the initial encryption key.

* * * * *